(12) United States Patent
Kreuzenstein et al.

(10) Patent No.: US 8,745,263 B2
(45) Date of Patent: Jun. 3, 2014

(54) SYSTEM FOR HIGH-SPEED LOW-LATENCY INTER-SYSTEM COMMUNICATIONS VIA CHANNEL-TO-CHANNEL ADAPTERS OR SIMILAR DEVICES

(75) Inventors: Ronald K. Kreuzenstein, San Jose, CA (US); Alberto Poggesi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 12/575,423

(22) Filed: Oct. 7, 2009

(65) Prior Publication Data

US 2011/0082948 A1     Apr. 7, 2011

(51) Int. Cl.
    *G06F 15/16* (2006.01)
(52) U.S. Cl.
    USPC ......................................... 709/234; 709/232
(58) Field of Classification Search
    USPC .................... 709/232, 234; 370/229
    See application file for complete search history.

(56) References Cited

U.S. PATENT DOCUMENTS

| | | | |
|---|---|---|---|
| 5,689,509 A | | 11/1997 | Gaytan et al. ............... 370/396 |
| 6,044,415 A * | | 3/2000 | Futral et al. ..................... 710/33 |
| 7,305,486 B2 | | 12/2007 | Ghose et al. ................ 709/232 |
| 7,386,626 B2 * | | 6/2008 | Kota et al. .................... 709/232 |
| 7,769,015 B2 * | | 8/2010 | Huang et al. ................. 370/394 |
| 7,818,447 B1 * | | 10/2010 | Niver et al. .................. 709/234 |
| 2001/0053148 A1 * | | 12/2001 | Bilic et al. ................... 370/389 |
| 2008/0267217 A1 * | | 10/2008 | Colville et al. .............. 370/477 |
| 2008/0317059 A1 * | | 12/2008 | Seigneurbieux ............. 370/417 |
| 2009/0067431 A1 * | | 3/2009 | Huang et al. ................. 370/394 |

OTHER PUBLICATIONS

"Principles of Operation" International Business Machines Corporation 1990-2008, SA22-7832-06, Seventh Edition, Feb. 2008, p. 1-1292.
Bhoedjang et al., "Evaluating Design Alternatives for Reliable Communication on High-Speed Networks" A.C.M. Cambridge, MA; Nov. 12-15, 2000.
Sur et al., "RDMA Read Based Rendezvous Protocol for MPI over InfiniBand: Design Alternatives and Benefits" ACM, New York, NY; Mar. 29-31, 2006.
Hellwagner et al., "VI Architecture Communication Features and Performance on the Giganet Cluster LAN" Future Generation Computer Systems, vol. 18, Issue 3, Jan. 2002, pp. 421-433.
"IBM Enterprise Systems Architecture/390 ESCON Channel-to-Channel Adapter" International Business Machines Corporation, SA22-7203-00, Oct. 1990, p. 1-48.

(Continued)

*Primary Examiner* — Umar Cheema
(74) *Attorney, Agent, or Firm* — Zilka-Kotab, PC (57) ABSTRACT

In one embodiment, a system includes at least one outgoing transmission engine implemented in hardware, wherein the at least one outgoing transmission engine is for transmitting data in the plurality of buffers queued to the at least one outgoing transmission engine to the intersystem transmission medium, and a memory for storing the plurality of buffers, wherein each of the buffers queued to the at least one outgoing transmission engine is dequeued after the data is transmitted therefrom and requeued to an available buffer queue. In another embodiment, a system includes the above, except that it includes one or more incoming reception engines instead of outgoing transmission engines. In another embodiment, a method includes buffering data to be sent out by executing a loop of commands on an intersystem communication device and disconnecting the buffers after data has been transferred.

16 Claims, 7 Drawing Sheets

(56) References Cited

OTHER PUBLICATIONS

"IBM System z ESCON and FICON Channel-to-Channel Reference" International Business Machines Corporation, SB10-7034-04, Fifth Edition, May 2006, p. 1-166.

Hellwagner et al., "VI Architecture Communication Features and Performance on the Giganet Cluster LAN," 2002 Elsevier Science B.V., Future Generation Computer Systems, vol. 18, Issue 3, Jan. 2002, INSPEC (AN-7201009) pp. 421-433.

* cited by examiner

SYSTEM FOR HIGH-SPEED LOW-LATENCY INTER-SYSTEM COMMUNICATIONS VIA CHANNEL-TO-CHANNEL ADAPTERS OR SIMILAR DEVICES

BACKGROUND

The present invention relates to computer systems and particularly to a high performance, low-overhead inter-system data transfer between open and/or closed operating systems (OSes) based on channel-to-channel adapters.

Communications between OS systems (whether closed such as IBM z/OS, open such as Linux, Windows, UNIX, etc., or mixed), are typically carried out using standard network infrastructure, such as internet protocol (IP). The communications typically exhibit relatively high overhead and latency.

Therefore, a communications solution which could lower overhead and latency would be beneficial to inter-system communications.

BRIEF SUMMARY

According to one embodiment, a system includes at least one outgoing transmission engine implemented in hardware, wherein the at least one outgoing transmission engine is for transmitting data in the plurality of buffers queued to the at least one outgoing transmission engine to the intersystem transmission medium. Also, the system includes a memory for storing the plurality of buffers, wherein each of the buffers queued to the at least one outgoing transmission engine is dequeued after the data is transmitted therefrom and requeued to an available buffer queue.

According to another embodiment, a system includes at least one incoming reception engine implemented in hardware, wherein the at least one incoming reception engine is for receiving data from an intersystem transmission medium and storing the data to a plurality of buffers queued to the at least one incoming reception engine. Also, the system includes a memory for storing the plurality of buffers, wherein each of the buffers queued to the at least one incoming reception engine is dequeued as received data is stored into it and requeued to at least one work queue.

According to yet another embodiment, a method for inter-system data transfer includes allocating at least one send and/or receive buffer in a host computer system memory; connecting the host computer system to another host computer system via an intersystem communication device operating in unidirectional mode; and executing a loop of commands on the intersystem communication device which causes the intersystem communication device to perform steps. The steps include: transferring a block of data from one host computer system to the other host computer system; examining a next I/O command, to determine whether the next I/O command is a data transfer command or a transfer-in-channel command pointing to a data transfer command; executing the next data transfer I/O command by transferring a block of data from one host computer system to the other host computer system in response to the next I/O command being a data transfer command or a transfer-in-channel command pointing to a data transfer command; and suspending execution of the loop of commands in response to the next I/O command not being a data transfer command or a transfer-in-channel command pointing to a data transfer command. The method also includes staging data for transfer for outgoing transmission by logically enqueueing a data transfer I/O command pointing to an outgoing data buffer at an end of an in-flight write channel program, with the proviso that the write channel program operation is not affected; disconnecting the outgoing data buffer from the in-flight write channel after data assigned to the buffer has been transferred; and returning the disconnected outgoing data buffer to an available buffer queue.

According to another embodiment, a computer program product includes a computer readable storage medium having computer readable program code embodied therewith. The computer readable program code comprises computer readable program code configured to: allocate at least one send and/or receive buffer in a host computer system memory; connect the host computer system to another host computer system via an intersystem communication device operating in unidirectional mode; and execute a loop of commands on the intersystem communication device which causes the intersystem communication device to execute code. The code includes computer readable program code configured to: transfer a block of data from one host computer system to the other host computer system; examine a next I/O command to determine whether the next I/O command is a data transfer command; execute the next I/O command by transferring a block of data from one host computer system to the other host computer system in response to the next I/O command being a data transfer command; and suspend execution of the loop of commands in response to the next I/O command not being a data transfer command. The computer readable program code also comprises computer readable program code configured to: stage data for transfer for outgoing transmission by logically enqueueing a data transfer I/O command pointing to an outgoing data buffer at an end of an in-flight write channel program, with the proviso that the write channel program operation is not affected; disconnect the outgoing data buffer from the in-flight write channel after data assigned to the buffer has been transferred; and return the disconnected outgoing data buffer to an available buffer queue.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems and methods for a high performance, low-overhead inter-system data transfer based on System Z channel-to-channel adapters (CTCAs) and/or based on open devices designed to be interoperable with System Z CTCAs. According to some embodiments, ESCON or FICON channel-to-channel infrastructure may be used for communications among Closed OS systems and Open OS systems equipped with Closed OS-compatible I/O subsystems, allowing low overhead, high throughput, and low latency. Additionally, some methods are used that minimize the software overhead usually associated with multi-threaded queuing/server systems. Although the following description does not specifically point it out, the methods described in this document may be used with devices other than z/Architecture CTCAs, as long as they provide similar capabilities. That should be kept in mind wherever CTCAs are referred to in this document.

In one general embodiment, a system comprises at least one outgoing transmission engine for transmitting data to an intersystem transmission medium, and a plurality of buffers, at least some of which are queued to the at least one outgoing transmission engine. The at least one outgoing transmission engine transmits data in the buffers queued to the at least one outgoing transmission engine to the intersystem transmission medium, and each of the buffers queued to the at least one outgoing transmission engine is dequeued after the data is transmitted therefrom and requeued to an available buffer queue. A computer system implementing such a general embodiment is sometimes referred to as a Data Originating Side (DOS).

In another general embodiment, a system includes at least one outgoing transmission engine implemented in hardware, wherein the at least one outgoing transmission engine is for transmitting data in the plurality of buffers queued to the at least one outgoing transmission engine to the intersystem transmission medium; and a memory for storing the plurality of buffers, wherein each of the buffers queued to the at least one outgoing transmission engine is dequeued after the data is transmitted therefrom and requeued to an available buffer queue.

In another general embodiment, a system comprises at least one incoming reception engine for receiving data from an intersystem transmission medium, and a plurality of buffers, at least some of which are queued to the at least one incoming reception engine. Data which is received from the intersystem transmission medium via the at least one incoming reception engine is stored to the buffers queued to the at least one incoming reception engine, and each of the buffers queued to the at least one incoming reception engine is dequeued as incoming data is stored into it and requeued to at least one work queue. A computer system implementing such a general embodiment is sometimes referred to as a Data Processing Side (DPS).

In another general embodiment, a system includes at least one incoming reception engine implemented in hardware, wherein the at least one incoming reception engine is for receiving data from an intersystem transmission medium and storing the data to a plurality of buffers queued to the at least one incoming reception engine; and a memory for storing the plurality of buffers, wherein each of the buffers queued to the at least one incoming reception engine is dequeued as received data is stored into it and requeued to at least one work queue.

In yet another general embodiment, a computer program product for intersystem communication comprises a computer readable storage medium having computer readable program code embodied therewith. The computer readable program code is configured to: allocate at least one send and/or receive buffer in a host computer system memory; connect the host computer system to another host computer system via an intersystem communication device operating in unidirectional mode; and execute a loop of commands on the intersystem communication device which causes the intersystem communication device to execute a code. The code includes computer readable program code configured to: transfer a block of data from one host computer system to the other host computer system; examine a next I/O command to determine whether the next I/O command is a data transfer command; execute the next I/O command by transferring a block of data from one host computer system to the other host computer system in response to the next I/O command being a data transfer command; and suspend execution of the loop of commands in response to the next I/O command not being a data transfer command. The computer program product also includes computer readable program code configured to: stage data for transfer for outgoing transmission by logically enqueueing a data transfer I/O command pointing to an outgoing data buffer at an end of an in-flight write channel program, with the proviso that the write channel program operation is not affected; disconnect the outgoing data buffer from the in-flight write channel after data assigned to the buffer has been transferred; and return the disconnected outgoing data buffer to an available buffer queue.

In another general embodiment, a method for intersystem data transfer includes allocating at least one send and/or receive buffer in a host computer system memory, connecting the host computer system to another host computer system via an intersystem communication device operating in unidirectional mode, executing a loop of commands on the intersystem communication device which causes the intersystem communication device to perform steps. The steps comprise: transferring a block of data from one host computer system to the other host computer system; examining a "next I/O command" to determine whether it is a data transfer command or a transfer-in-channel command pointing to a data transfer command. executing the next I/O command by transferring a block of data from one host computer system to the other host computer system in response to the next I/O command being a data transfer command or a transfer-in-channel command pointing to a data transfer command; and suspending execution of the loop of commands in response to the next I/O command not being a data transfer command or a transfer-in-channel command pointing to a data transfer command. The term "next I/O command" refers to the I/O command which the I/O subsystem was instructed to execute next; normally, such I/O command is located immediately following the last executed I/O command in the host computer system memory. The method also comprises staging data for transfer for outgoing transmission by logically enqueueing a data transfer I/O command pointing to an outgoing data buffer at an end of an in-flight write channel program, with the proviso that the write channel program operation is not affected, disconnecting the outgoing data buffer from the in-flight write channel program after data assigned to the buffer has been transferred, and returning the disconnected outgoing data buffer to an available buffer queue.

As will be appreciated by one skilled in the art, aspects of the present invention may be embodied as a system, method, or computer program product. Accordingly, the present invention may take the form of an entirely hardware embodiment, a software embodiment (including firmware, resident software, micro-code, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc (CD-ROM, CD-R, CD-RW, etc.), a data DVD (DVD-ROM, DVD-RAM, DVD-R, DVD+R, DVD-RW, DVD+RW, etc.), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, assembly languages, machine languages, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions and/or in hardware. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
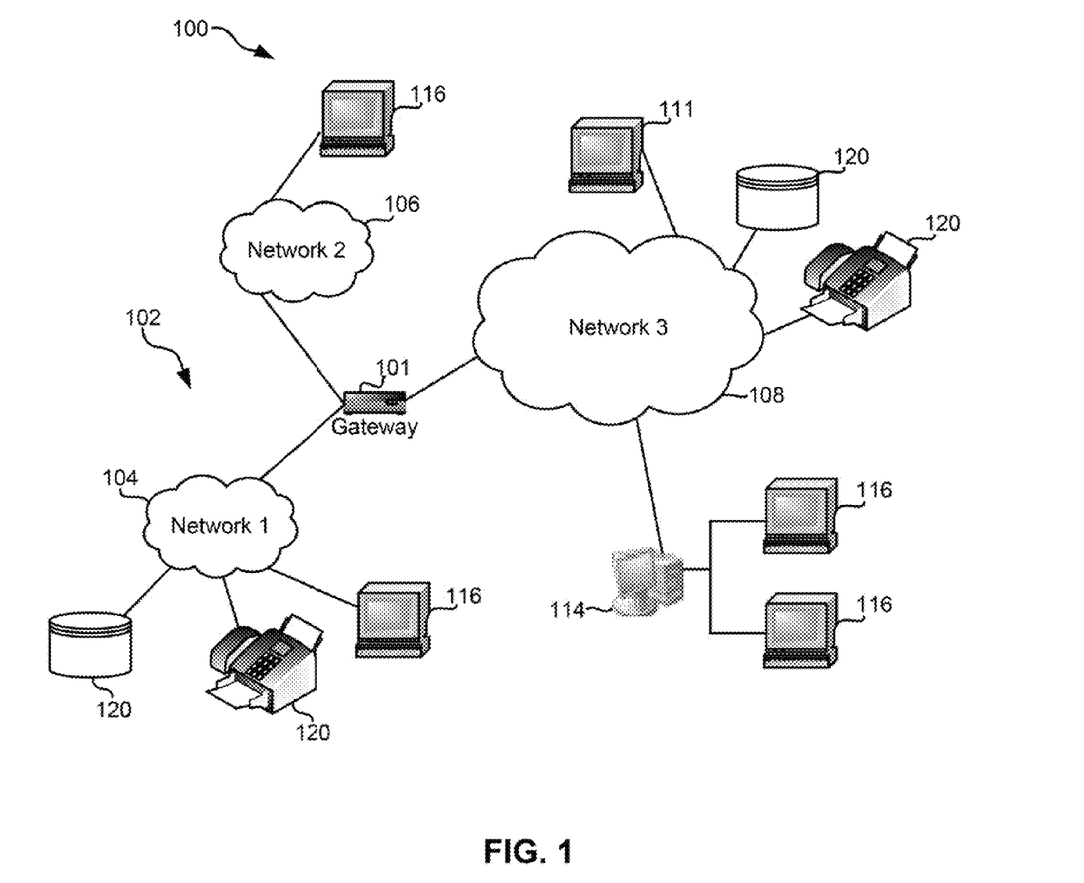
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
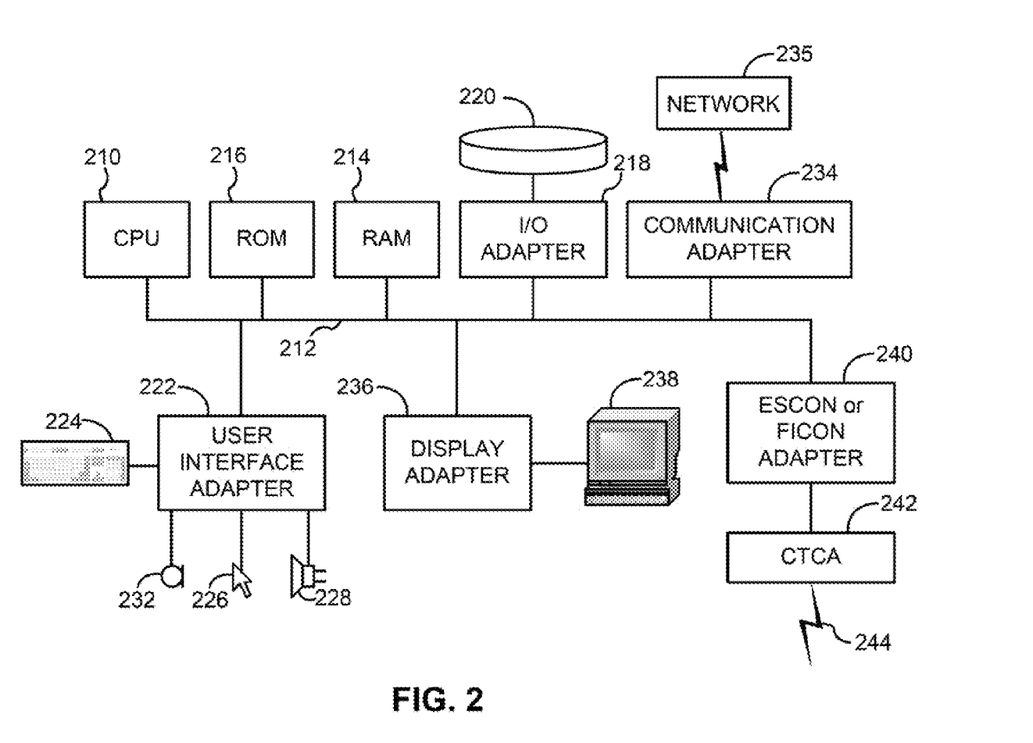
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a computer system having a central processing unit 210, such as a microprocessor, and a number of other units interconnected via a system bus 212.

The computer system shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the computer system to a communication network 235 (e.g., a data processing network), a display adapter 236 for connecting the bus 212 to a display device 238, and an ESCON or FICON adapter 240 for connecting the bus 212 to an intersystem communication device such as a CTCA 242, which in turn is connected through the infrastructure 244 to another computer system.

The computer system may have resident thereon an operating system such as the Microsoft Windows® Operating System (OS), a Mac OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 7:
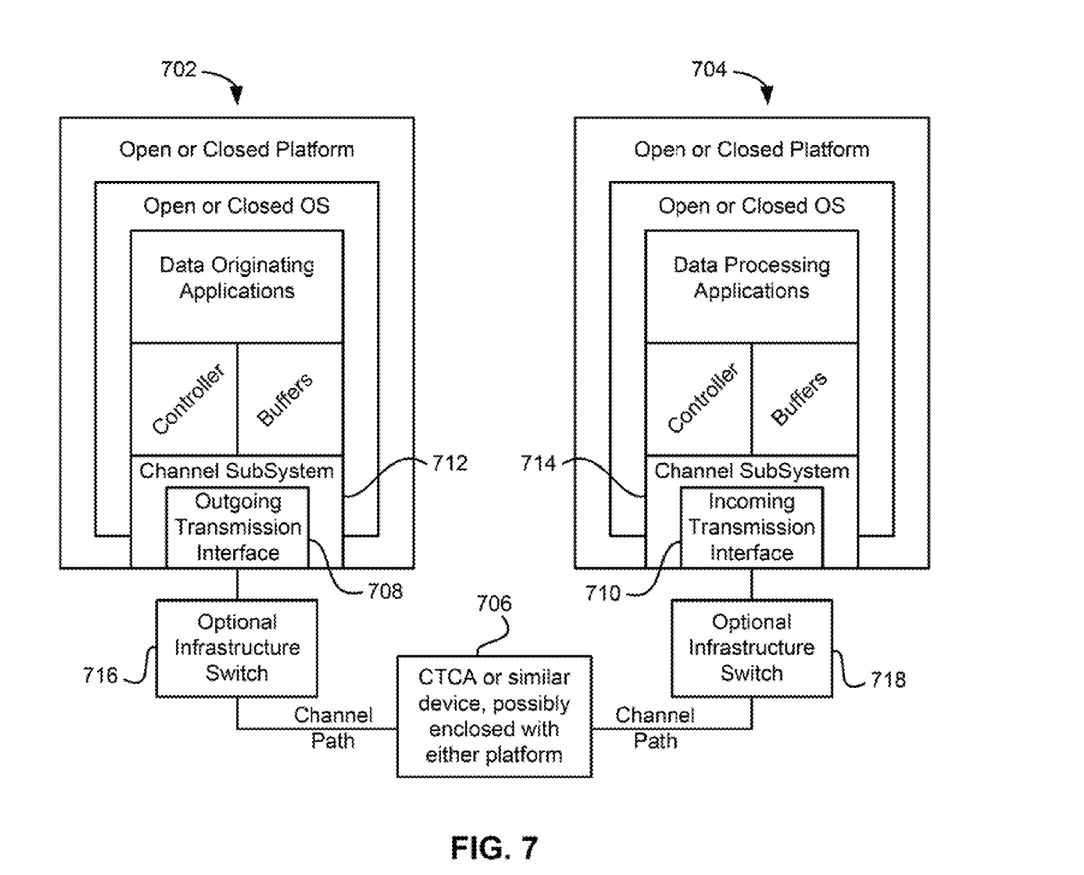
FIG. 7 depicts a configuration for intersystem communication, according to one embodiment.

FIG. 7 exemplifies one of the many embodiments of this invention. It represents two computer systems 702, 704, connected via an intersystem communication engine, such as a CTCA 706 or similar device. Each of the two systems may be open or closed. Computer system 702 (DOS) originates the data to be processed by computer system 704 (DPS). The CTCA 706 may be a standalone device or it may be incorporated into the transmission interface 708, 710 or the channel subsystem 712, 714 of one of the communicating computer systems 702, 704. An optional infrastructure switch 716, 718 may connect the channel paths between the two computer systems 702, 704. Other embodiments may have zero or more DOSes and/or zero or more DPSes, with some, none, or all connected to each other.

OVERVIEW

Many of the terms and phrases that are used in computing generally and used herein relating to descriptions of many embodiments, may be described in more detail in a system architecture's operating manual, such as IBM's z/Architecture Principles of Operation, document number SA22-7832-06, which is hereby incorporated by reference, which can be accessed generally from IBM's website.

The synopsis in sections [0045] through [0051] is provided for convenience only and should not be construed to be the complete and precise definition of any of the terms used in this document.

A Channel Subsystem (CSS) is a component of the z/Architecture which directs the flow of information between I/O devices and main storage, by executing sets of program directives called Channel Programs. It runs on a set of processors and/or processes independent of the CPUs. Other systems may have equivalent devices which mimic the functionality of the CSS in the z/Architecture, and these devices are included in each reference to CSS.

The physical connections between CSS and control units or devices are called Channel Paths. Multiple Channel Paths may exist between a CSS and a control unit or device; if so, the CSS is responsible for selecting a channel path for every specific I/O operation.

Channel Programs are created by the operating system or other software, they are initiated by the CPU and they are executed by the CSS independently of the CPU until the end of the Channel Program is reached, or until an abnormal condition is encountered. The CSS keeps track of the state of each Channel Program using a set of CSS resources associated with the target I/O device, called a Subchannel. The CPU instruction used to initiate execution of a Channel Program directed to a particular device is called Start Subchannel (SSCH).

Channel Programs are sets of double-word Channel Command Words (CCWs), comprising:

A command code indicating the data transfer or control operation to be performed;

A main storage data address where the data for the transfer or control operation resides or is to be placed;

A byte count indicating the number of data bytes to be transferred;

A set of flag bits indicating the options to be used during the execution of the CCW. Examples of such flags are:

Chain Command (CC): at the normal completion of the current CCW, causes the subchannel to fetch the double-word immediately following it in main storage and to make it the current CCW.

Indirect Data Addressing (IDA): indicates to the subchannel that the data address in the CCW does not point directly to the data area, but to an array of one or more Indirect Data Address Words (IDAWs) which in turn point to the data areas.

Program-Controlled Interruption (PCI): causes the subchannel to make an I/O interruption pending for the CPU when (or soon after) the CCW containing the flag becomes current.

Suspend (S): causes the subchannel to suspend the I/O operation when the CCW containing the flag becomes current. An I/O interruption is optionally made pending when this occurs. The CPU can then resume the I/O operation after the Channel Program has been updated (e.g. by appending additional CCWs and clearing the Suspend flag in the current CCW), using the Resume Subchannel (RSCH) instruction.

CCWs belonging to the same Channel Program are often contiguous in storage, but not necessarily. Channel Program execution may be continued with a CCW at any double-word-aligned main storage address by means of a CCW with the Transfer-In-Channel (TIC) command code, specifying the main storage address of the target CCW as its data address. CCWs may be specific types of I/O commands.

A Channel-to-Channel Adapter (CTCA) is an I/O device used in z/Architecture systems, which directly connects one CSS to another, allowing them to exchange data, quickly, efficiently and reliably. Typically two systems communicate with each other using a CTCA by concurrently executing channel programs containing "matching" commands. Read CCWs on one system are matched by write CCWs on the other system. For example, if the channel program on system A contains read CCWs and the channel program on system B contains write CCWs, information can flow from system B to system A. Data is transferred at wire/fiber speeds between the systems, without requiring additional processing of various headers and checksums, as is the case with TCP/IP.

Examples of CTCA devices similar to those referred to herein relating to descriptions of many embodiments, may be found in device manuals such as the following, which can be accessed generally from IBM's website, and may be accessed specifically at the time of filing as indicated below:

IBM Enterprise Systems Architecture/390 ESCON Channel-to-Channel Adapter, document number SA22-7203-00, which is hereby incorporated by reference IBM System z ESCON and FICON Channel-to-Channel Reference, document number SB 10-7034-04, which is hereby incorporated by reference IBM Enterprise Systems Architecture/390 Channel-to-Channel Adapter for the System/360 and System/370 I/O Interface, document number SA22-7091-01, which is hereby incorporated by reference According to some embodiments of the present invention, a goal of the invention is to minimize the overhead and latency associated with inter-system data transfers between DOS and its corresponding DPS. The specific software and/or hardware used to implement the characteristics of the embodiment are sometimes called OS agents. Each OS Agent can be an Open OS Agent (OOA) or a Closed OS Agent (COA). An Open OS system may include Windows-, Linux-, UNIX-, etc., based systems and/or servers. A Closed OS system may include z/OS systems and/or servers or any other type of closed architecture system. The Input/Output Supervisor (IOS) overhead at both ends (DOS and DPS) may be reduced to a minimum by the use of the suspend/resume technology currently used in IBM and/or other paging subsystems, which in turn allows additional data transfer requests to be added to an active I/O operation, as long as they are received while the I/O operation is still in progress. Other software overhead and latency may be reduced on either side by allowing the requestor processes and threads to directly submit data transfer requests to the local Channel Subsystem. This may be enabled by the use of lockless queuing and dequeuing schemes, and by other design choices, according to some approaches.

After both ends are initialized, all Channel-to-Channel Adapters (CTCAs) or similar devices may be used in a unidirectional fashion in some approaches, i.e., with the exception of any control commands that do not transfer data, they only execute all read commands or all write commands. Depending on the embodiment, CTCAs and similar devices may use optical fiber cables, electrical cables (e.g., Ethernet cables, Bus-and-Tag style electrical cables, etc.), wireless technologies or any other physical transmission means between the two or more independent I/O channel subsystems, e.g., the Open Channel Subsystem (OCSS) and the Closed Channel Subsystem (CCSS), or two or more channel subsystems of the same type. Of course, the subsystems may be running on similar or dissimilar platforms.

According to some approaches, after both ends of the CTCAs are initialized, until termination of operations, and except for CTCA I/O error recovery, all CTCAs execute what are known as "never-ending" channel programs (i.e., channel programs designed to continue to remain executable indefinitely by the local Channel Subsystem, even in the absence of data to transfer), using the Suspend/Resume feature of an IBM and/or other channel subsystems. This scheme minimizes the IOS overhead at both ends of the communication. It also allows asynchronous data transfer requests to be serviced with a minimal amount of latency. Channel program execution is initiated by executing the start subchannel (SSCH) instruction.

Program-Controlled Interruptions (PCIs) (or their equivalent on the Open OS) may be used to manage the channel programs according to some preferred embodiments, by removing Channel Command Words (CCWs) whose execution has been completed and by inserting CCWs for new data to be sent or received. For outgoing data transfers, in the normal case, individual CCWs may be inserted into the channel programs directly by the data transfer requesting processes thread (or task); however, in special cases, such insertions may be performed by the code that handles the PCIs, as CCW slots become available. For incoming data transfers, CCWs may be inserted initially by the initialization code, and subsequently by the code that handles PCIs, according to one embodiment.

Buffers

Data transfer requests may be associated with buffers, according to some embodiments. In addition to the payload, buffers may contain control information, for example, the number of bytes actually used in the buffer for data that is to be transferred.

Buffers that are not in use may reside in one or more "available" queues, from which they are taken when needed, and to which they are returned when no longer needed, with atomic operations. For the purposes of the descriptions included herein, it is not important whether buffers exist in variable sizes, or how the storage that they occupy is managed. For simplicity, in one embodiment, buffers may all be 64 KB in size and permanently allocated. In addition, in some embodiments, each buffer may be described by one element in a buffer-descriptor-array. This allows individual buffers in the system to be fully identified by their index number.

Channel Programs

Channel programs are the interface between the OS software (both on Open and Closed systems) and the respective channel subsystems (OCSS and CCSS, respectively). On the Data Originating Side (DOS), I/O requests may be submitted by many different processes and threads. To eliminate the obvious overhead that would result from an additional thread dedicated to submitting work to the channel subsystem, the methods and systems described herein are designed such that each of the individual user processes and threads may directly package and send their requests to the Data Processing Side (DPS), according to some approaches.

The details of the channel programs described herein are for illustrative purposes only, and are not meant to be limiting in any way. Some embodiments may include channel commands indicated below as Read Data or Write Data to be replaced by more complex constructs, possibly using two or more consecutive CCW slots for some or for all I/O requests, and/or possibly transferring the control of the channel program to disjoint CCW chains and back to the main CCW array for some/all I/O requests. That is normally referred to as "TIC-ing" as it is obtained using Transfer-in Channel (TIC) CCWs whenever control of the channel program is directed to go to other than the next sequential doubleword slot in memory. Similar considerations should be made for the CCW flags mentioned below, for example program-controlled interruption (PCI), chain command (CC), suspend (S), etc.

Figure 3:
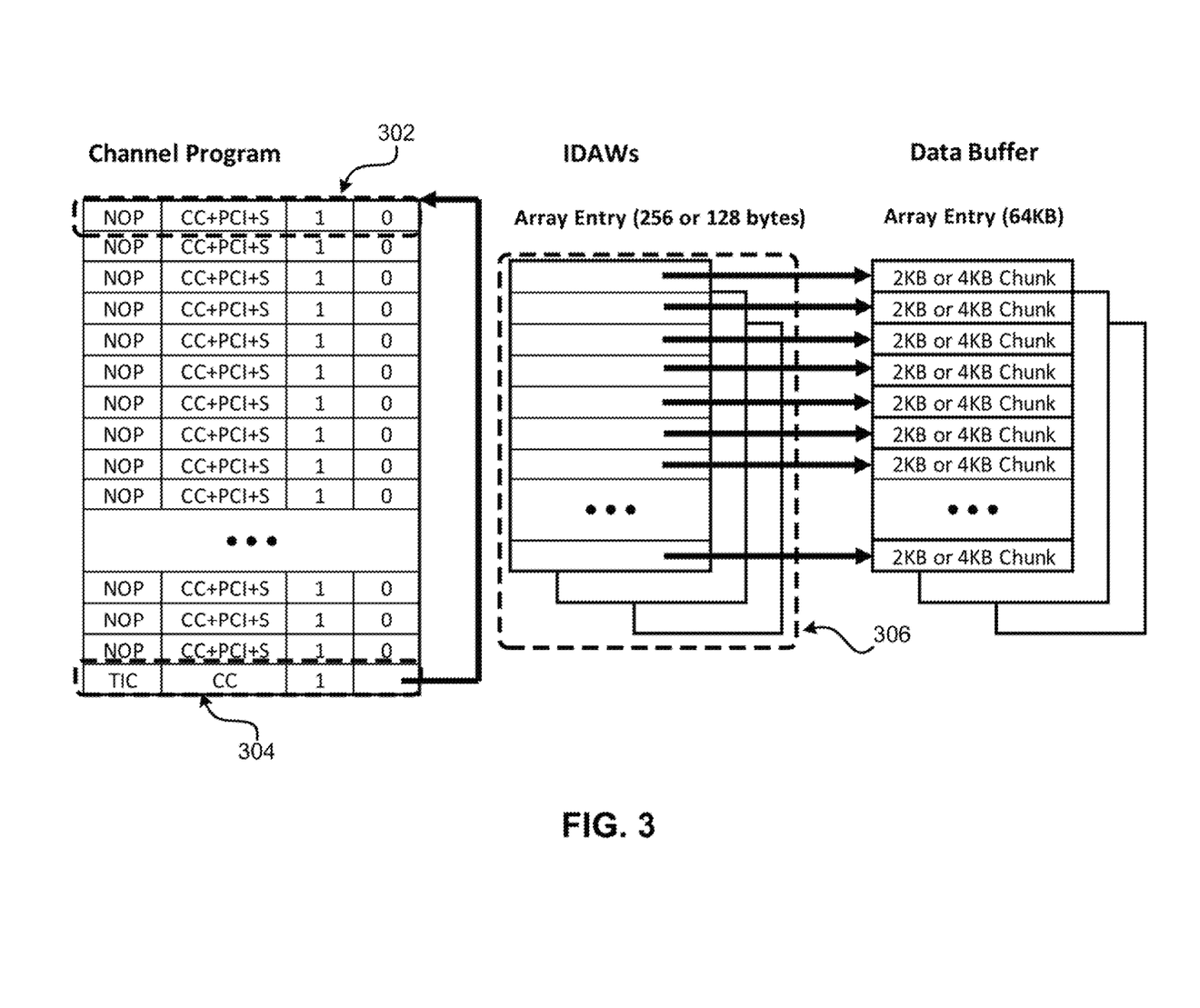
FIG. 3 depicts illustrative initialized channel program arrays of CCW slots, according to one embodiment.

Now referring to FIG. 3, according to one embodiment, channel programs may be shown as arrays of CCW slots, initialized similarly to how they are shown in FIG. 3. Notice that the last element of the array 304 may not be used for data transfer CCWs, as it remains a TIC to the top of the channel program (element [0] in the array 302) for the life of the system. Notice also that indirect data address words (IDAWs) 306 may not be necessary, for instance if buffers are all below the 2 GB line and they are contiguous in real storage.

A control structure is associated with each channel program. Keeping the size of such control structure within 8 bytes or less allows lockless insertion and removal of individual CCWs both on Closed OSses and on Open OSses Generally, the structure contains the following fields:

Suspended Flag: This flag is set by the PCI appendage routine when the subchannel status that it stores indicates that the channel program is suspended, unless the same appendage routine resumes it during the same invocation. The flag is reset by the process that enqueues a new CCW, when it determines that the channel program is suspended. Notice that in this case, the enqueuing process issues a resume subchannel instruction (RSCH) and triggers the appropriate error recovery if the RSCH does not complete normally.

Completed Flag: This flag is set by the PCI appendage routine when the stored subchannel status indicates that the channel program has terminated. The flag is reset by the process that enqueues a new CCW in a channel program that has the complete flag ON. Notice that in this case, the enqueuing process issues a start subchannel instruction (SSCH) and triggers the appropriate error recovery if the SSCH does not complete normally.

CCW Count: This is the number of data transfer CCWs currently in the channel program. It is used by the enqueuing process to determine whether an additional CCW can be inserted into the channel program, or if it should be queued into the "start-pending" queue, instead. Notice that this "start pending" queue is different from any queues that CCSS or OCSS may have related to the architecturally-defined "start pending" function. For CCSS and OCSS, "start pending" is a subchannel attribute. For simplicity, throughout this document, "start pending" may be considered a queue of inactive CCWs which point to buffers ready to be transmitted and which are waiting to become part of the active, never-ending channel program, to allow the data to be transmitted. The buffers in the "start pending" queue cannot be inserted in the target channel program yet, because too many active CCWs are already part of that channel program. If enqueuing is allowed into the channel program, the count is increased by one. This count is decreased by the PCI appendage routine, for every CCW that it removes from the channel program after determining that its execution has been completed.

Next NOP: This is the position in the channel program of the first NOP CCW available to be replaced by a data transfer CCW. The enqueuing algorithm leaves at least one such CCW in the channel program at all times. This field is initialized to point to the top of the channel program (element [0] in the array, identified as 302 in FIG. 3), and is then updated by the enqueuing process every time a new CCW is inserted into the channel program.

Oldest CCW: This is the position of the oldest data transfer CCW in the channel program. This is only meaningful if the current CCW count is greater than zero. It is set by the enqueuing process when a CCW is inserted into an empty channel program, and updated by the PCI appendage routine, whenever it removes a CCW from the channel program after determining that its execution has been completed.

Figure 4:
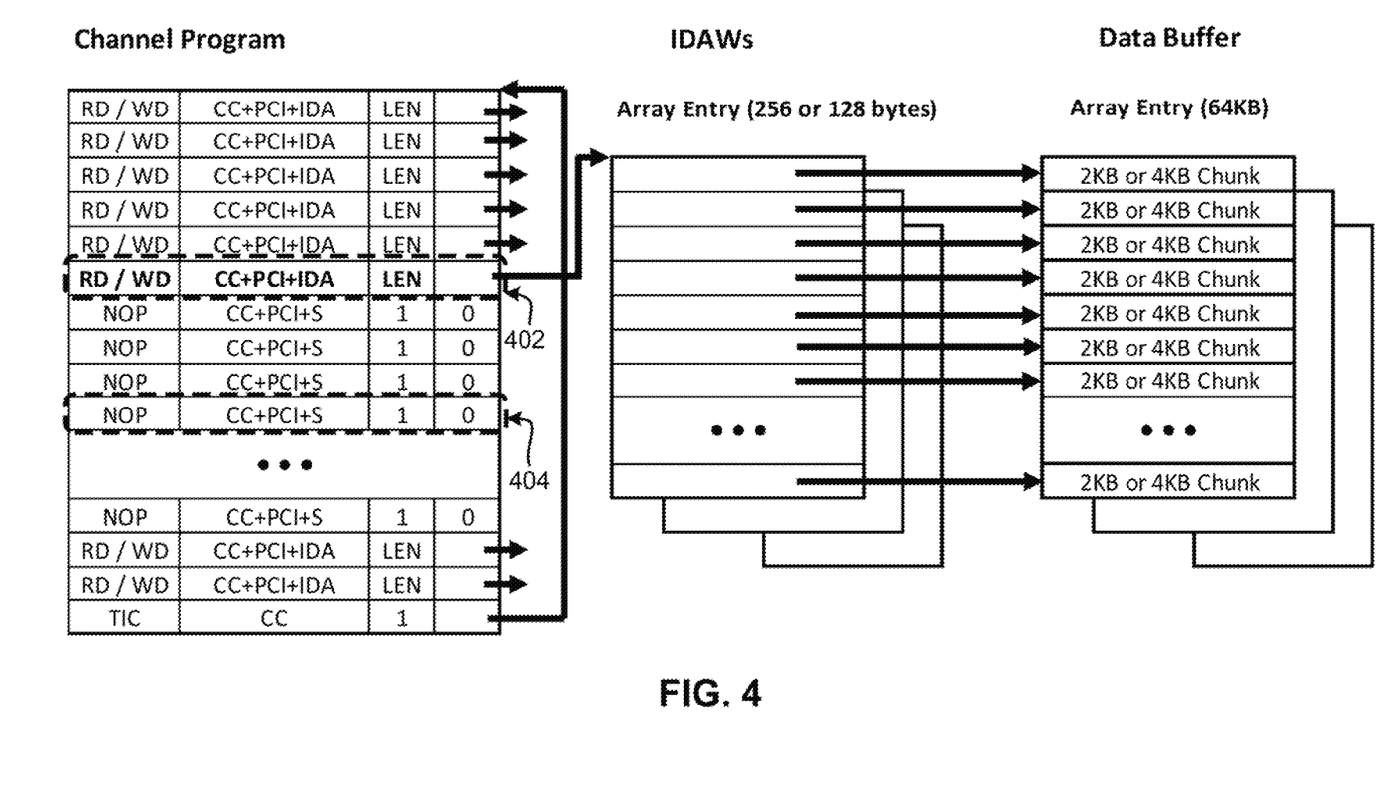
FIG. 4 depicts illustrative enqueuing of CCWs to the active channel program, according to one embodiment.

Now referring to FIG. 4, more details of adding CCWs to the active channel program may be described according to one embodiment. When a data transfer request is generated, the requesting process may dequeue one buffer from the appropriate available queue (more than one available queue may exist, if buffers are organized by some criteria, such as size, etc.), may fill it with the data to be transferred as well as with the control information, then it may create a CCW to transfer the data and may insert it into in the appropriate outgoing channel program (for example in slot 402) with an atomic operation, replacing a CCW that may have looked like that depicted in slot 404. Multiple channel programs may exist, in general. The selection of which one to use may be based on decisions made by the requesting process or by other processes, for example by updating information in shared control blocks.

The same atomic operation may also detect whether the channel program was empty and suspended; in that case, the requesting process also may resume the channel program (RSCFI). If there is no room in the channel program for this CCW, the CCW may be queued into a "start-pending" queue. One algorithm that can be used to insert a CCW into a channel program is described in more detail below.

Input Buffers Replenishment (Incoming)

When the PCI appendage routine removes a CCW from a read channel program because the corresponding buffer processing has been completed by the channel, it may also enqueue (or consider enqueuing, if an optimization algorithm is implemented) a fresh read buffer into the channel program, following the same rules described above in relation to FIG. 4 for the enqueuing process.

PCI Appendage Routine

Figure 5:
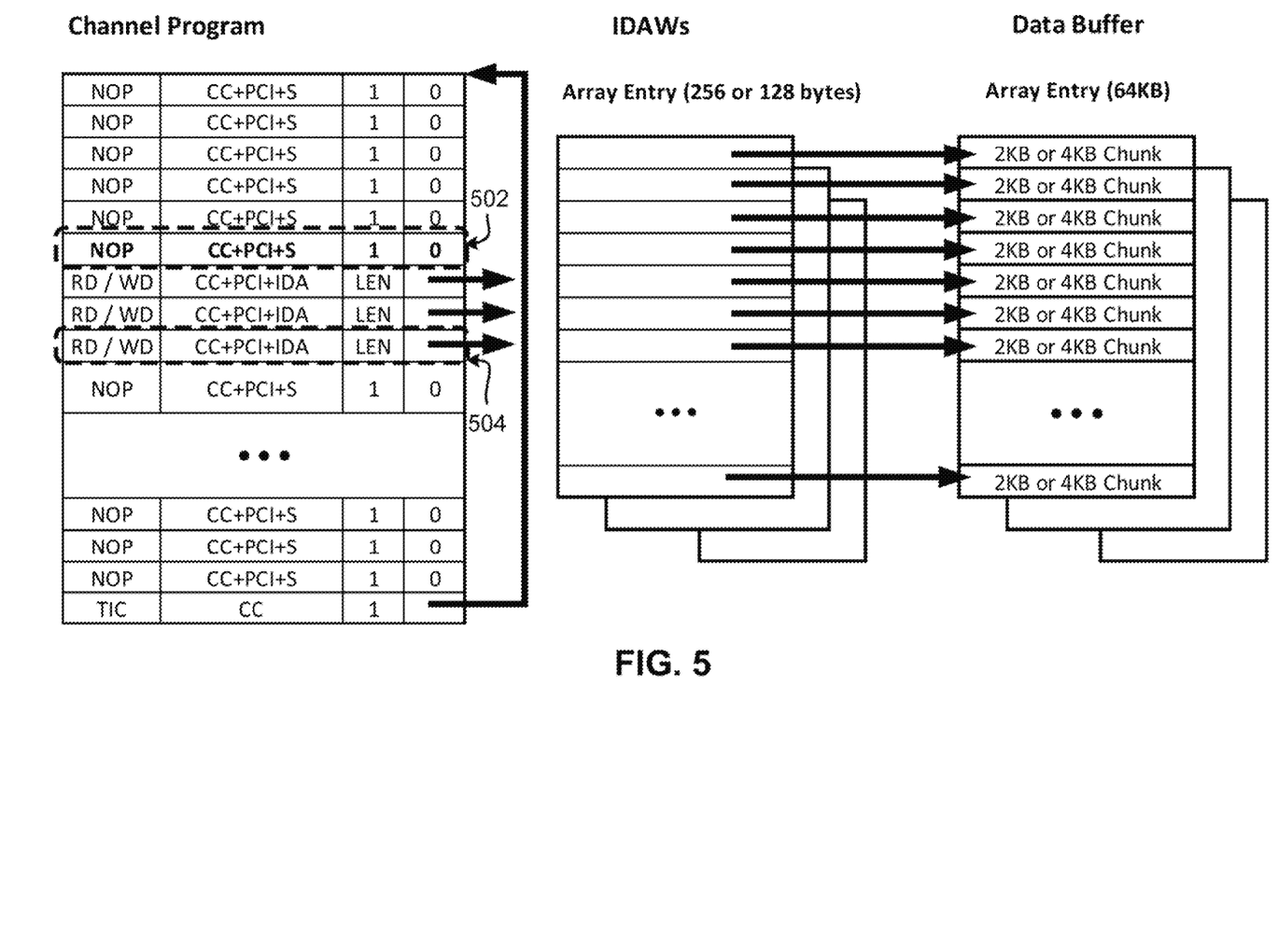
FIG. 5 depicts illustrative dequeuing of CCWs from the active channel program, according to one embodiment.

Now referring to FIG. 5, more details of the process of removing CCWs from the active channel program may be described. An algorithm according to one approach that can be used to remove a CCW from a channel program is described below. The PCI Appendage routine is responsible for:

Removing from the channel program all the CCWs whose execution completed, starting with the one pointed to by the Oldest CCW field of the control structure (for example the CCW located in slot 502, which before the removal may have looked like that depicted in slot 504), through the one (if any) pointed to by the subchannel status.

Updating the Oldest CCW field.

Decreasing the CCW count.

The following functions may be performed inline by the PCI appendage routine or by a separate process thread (or task) unblocked (or posted) by it:

Properly disposing of the buffers associated with the removed CCWs to the process thread or task that can process them.

Unblocking (or posting) such process threads (or tasks).

Deciding whether a new CCW should be added to the channel program, and if so adding it:

On outgoing subchannels, if the "start-pending" queue is not empty.

On incoming subchannels, to prepare for receiving additional data traffic.

Resuming the channel program (RSCH) if the subchannel status shows that it was suspended, and if the CCW count is greater than zero.

Setting the SUSPENDED flag in the channel program control structure if the subchannel status shows that it was suspended, and if the CCW count is zero.

Adding a CCW to a Channel Program

The process, according to one approach, may be to:

1. Fetch the channel program control structure.
2. Test whether the channel program has capacity for one additional CCW. If so, the operation continues with the following steps. If not, the CCW is queued to the "start-pending" CCW queue and the operation is considered complete.
3. If the CCW count is zero, set the Oldest CCW field to point to the CCW being inserted.
4. Increase the CCW count by 1. Clear the SUSPENDED and COMPLETED flags.
5. Update the Next NOP field to point to the slot immediately following this CCW, in the logically circular channel program. If it is the TIC, point back to the top of the channel program (element [0] in the array).
6. Attempt a compare-and-exchange (or 64-bit compare-and-swap) for the channel program control structure.
7. If update fails, go back to step 1.
8. If update succeeds, a slot was effectively "reserved" in the channel program for the data transfer CCW being inserted.
9. Replace the NOP in the "reserved" slot with the appropriate data transfer CCW. All 8 bytes of the CCW may be replaced simultaneously with an atomic operation, or, in some embodiments, the flag byte in which the suspend bit is being dropped may be replaced after the rest of the CCW. Notice that during the time window between steps 8 and 9, the "stale" NOP CCW may be fetched by the channel. However, there is no risk that it may be mistaken for a completed data transfer CCW by the PCI appendage routine. If the channel fetches it before step 9, then it will suspend, and the data transfer will take place after the "kick channel program" function.
10. At the end of this algorithm, the invoking code will execute the "kick channel program" function (see below).

Removing a Ccw from a Channel Program

The following steps may be followed, according to one embodiment, to remove a CCW from a channel program.

1. Fetch the data transfer CCW to remove and save it for processing in step 8.
2. Fetch the channel program control structure.
3. Decrease the CCW count by 1.
4. Change the Oldest CCW field to point to the CCW following this CCW, in the logically circular channel program. If it is the TIC, point back to the top of the channel program (element [0] in the array).
5. Attempt a compare-and-exchange (or 64-bit compare-and-swap) for the channel program control structure.
6. If update fails because the Oldest CCW field has changed, this CCW must have been already removed by some other thread or task, and nothing else needs to be done, regardless of whether or not other channel program control structure fields have changed also.
7. If update fails because some other fields have changed, but the Oldest CCW field hasn't, go back to step 2.
8. If update succeeds, appropriately dispose of the buffer associated with the CCW that was just removed and post (or unblock) the appropriate tasks or process threads.
9. At the end of this algorithm, the invoking code will execute the "kick channel program" function (see below).

"Kick Channel Program" Function

The following process may be followed to execute the "Kick Channel Program" function, according to some embodiments.

1. Notice that the SUSPENDED and COMPLETED flags should never be both ON, unless such representation is chosen to signify some application-dependent information. In this case, the information can be retrieved and acted upon at this point:
2. If the SUSPENDED and COMPLETED flags are not both ON before the compare-and-exchange):
   a. If SUSPENDED==1, issue RSCH.
   b. If COMPLETED==1, update ORB, issue SSCH.

Recovering from Data-Structure-Full Conditions

Fixed-capacity data structures like the queues, channel programs, and lists described herein may accommodate up to a pre-determined, fixed number of elements. These elements allow straightforward, lockless enqueuing and dequeuing, which in turn may enable key performance advantages.

One of the implications of using these types of data structures is that design provisions must be included for avoiding or handling situations, called data-structure-full conditions, in which enqueuing for more entries than can be accommodated is requested. Suitable generic data-structure-full avoidance and recovery strategies are well known in the art, and in some cases, specific ones can also be easily designed that are best suited for the individual circumstances. Describing generic data-structure-full avoidance and recovery strategies in any detail is beyond the scope of the invention, and therefore such strategies will not be described herein.

Buffer Queues

A buffer queue is an ordered set of buffers. Multiple buffer queues may exist in the system. Each buffer queue is an array of "n" 8-byte elements, according to one approach. Up to "n−1" buffers can be in the queue at any given time.

Element [0] is a control element and consists of three fields:
COUNT This is the number "n−1" and indicates the size of the queue.
HEAD This is the Queue Element index of the queue entry describing the next buffer to be dequeued.
TAIL This is the Queue Element index of the queue entry where the description of the next enqueued buffer should be stored.

Elements [1] through [n−1] are either undefined (which for example may be stored as zero, i.e., NULL pointers) or buffer references. Such references may be pointers to the target buffers, or indices for the target buffers into the buffer descriptor array, or any other type of buffer references.

If TAIL>HEAD: Elements [HEAD] through [TAIL-1] point to buffers in the queue, in the proper order. Also, elements [TAIL] through [n−1] and [1] through [HEAD−1] are available slots; e.g., their values are undefined and should be ignored.

If TAIL=HEAD: the queue is empty. Elements [1] through [n−1] are available slots; their values are undefined and should be ignored.

If TAIL<HEAD: Elements [HEAD] through [n−1] and [I] through [TAIL−1] point to buffers in the queue, in the proper order. Also, elements [TAIL] through [HEAD−1] are available slots; e.g., their values are undefined and should be ignored.

Notice that for at least Element [0], initialization must take place at the appropriate time.

Buffer Enqueuing

The following process may be used for buffer enqueuing, according to one approach.

1. Fetch the control element. NEW_TAIL=OLD_TAIL+1.
2. Notice that the SUSPENDED and COMPLETED flags should never be both ON, unless such representation is chosen to signify some application-dependent information. In this case, the information can be retrieved and acted upon at this point.
3. If NEW_TAIL>=COUNT, NEW_TAIL=1.
4. Compare and exchange the control element. If unsuccessful, go to step 1.
5. Store the new buffer pointer into slot [OLD_TAIL]. Notice that the potential exists for a stale buffer pointer to be dequeued from slot [OLD_TAIL] during the time between steps 4 and 5. However, such event may be avoided by:
   c. Steps 5 and 6 in the dequeuing algorithm below, or
   d. Making steps 4 and 5 above uninterruptable.

Buffer Dequeuing

The following process may be used for buffer dequeuing, according to one approach.

1. Fetch the control element. NEW_HEAD=OLD_HEAD+1.
2. If NEW_HEAD>=COUNT, NEW_HEAD=1.
3. Fetch pointer from slot [OLD_HEAD].
4. Compare and swap the control element. If unsuccessful, go to step 1.
5. If the pointer in slot [OLD_HEAD] is zero, refetch it until it becomes non-zero. This process may take some time, if the enqueuing thread has been undispatched between steps 4 and 5. Therefore, a time-out check may be performed, if the enqueuing process steps 4 and 5 cannot be described to the OS as "must complete."
6. Compare and swap the pointer in slot [OLD_HEAD] with zero. If unsuccessful, abort (a malfunction must have occurred).
7. Use the buffer pointer fetched in step 5 above.

Notice that steps 5 and 6 in this algorithm are not necessary if steps 4 and 5 in the enqueuing algorithm are made uninterruptible.

Buffer Lists

A buffer list is an un-ordered set of buffers. Multiple buffer lists may exist in the system. In its simplest form, a buffer list is a bitmap of buffer indices. Such a bitmap may be updated with atomic operations.

SPECIFIC EMBODIMENTS

According to one embodiment, a system includes at least one outgoing transmission engine for transmitting data to an intersystem transmission medium, and a plurality of buffers, at least some of which are queued to the at least one outgoing transmission engine. The at least one outgoing transmission engine transmits data in the buffers queued to the at least one outgoing transmission engine to the intersystem transmission medium, and each of the buffers queued to the at least one outgoing transmission engine is dequeued after the data is transmitted therefrom and requeued to an available buffer queue.

In some approaches, the intersystem transmission medium may be comprised of at least one of an optical fiber cable, a wireless radio frequency infrastructure, and an electrical cable. An electrical cable may include an Ethernet cable, a Bus-and-Tag style electrical cable, etc.

In more embodiments, the at least one outgoing transmission engine may be implemented using any of a mainframe type channel subsystem, an interface of a mainframe type intersystem communication device (e.g., a CTCA), a mainframe type channel program, at least one data buffer including outgoing data, and queueing and dequeueing methods that enable outgoing data to be introduced to another system. Of course, more than one of the above listed devices may be used in implementing the outgoing transmission engine.

According to some approaches, at least a portion of the system may be a virtual computer system. For example, the outgoing transmission engine may be run on a virtual computer system, while the remainder of the system is executed on a real computer system, which may also execute the virtual computer system.

According to another embodiment, a system comprises at least one incoming reception engine for receiving data from an intersystem transmission medium, and a plurality of buffers, at least some of which are queued to the at least one incoming reception engine. Data which is received from the intersystem transmission medium via the at least one incoming reception engine is stored to the buffers queued to the at least one incoming reception engine, and each of the buffers queued to the at least one incoming reception engine is dequeued as incoming data is stored into it and requeued to at least one work queue.

In some approaches, the first and second computer systems may be running different operating systems. In more approaches, for each of the computer systems individually: buffers that are not in use may be allocated to an available buffer queue. The buffers in the available buffer queue may be available to receive more data, but first are moved out of the available buffer queue to do so. For a buffer to become usable for data, it first is moved out of the available queue waiting to be put into some other (not available) queue for processing (e.g., an incoming or outgoing channel program, the "start pending" queue, etc.).

In some approaches, the at least one incoming reception engine may be implemented using any of a mainframe type channel subsystem, an interface of a mainframe type intersystem communication device (e.g., a CTCA), a mainframe type channel program, at least one incoming data buffer including incoming data, and queueing and dequeueing methods that enable incoming data to be extracted from another system.

According to some approaches, the at least one incoming reception engine may be operatively coupled to at least one outgoing transmission engine of another system via the intersystem transmission medium. This allows for intersystem communication between the two systems. In further embodiments, the at least one incoming reception engine may be implemented using any of: a mainframe type channel subsystem, an interface of a mainframe type intersystem communication device (e.g., a CTCA), a mainframe type channel program, at least one incoming data buffer including incoming data, and queueing and dequeueing methods that enable incoming data to be extracted from another system.

Further, in some embodiments, the intersystem transmission medium may be comprised of at least one of: an optical fiber cable, a wireless radio frequency infrastructure, and an electrical cable.

According to some approaches, at least a portion of the system may be a virtual computer system. For example, the incoming reception engine may be run on a virtual computer system, while the remainder of the system is executed on a real computer system, which may also execute the virtual computer system.

In more embodiments, the system may further include at least one outgoing transmission engine for transmitting data to an intersystem transmission medium, and a plurality of second buffers, at least some of which may be queued to the at least one outgoing transmission engine. The at least one outgoing transmission engine may transmit data in the second buffers queued to the at least one outgoing transmission engine to the intersystem transmission medium, and each of the second buffers queued to the at least one outgoing transmission engine may be dequeued after the data is transmitted therefrom and requeued to an available buffer queue.

Some additional embodiments include a system where at least one outgoing transmission engine and at least one incoming reception engine may be operatively coupled to a second system via the intersystem transmission medium. This allows for bi-directional intersystem communications between the two systems.

In some additional approaches, the at least one outgoing transmission engine and the at least one incoming reception engine may be implemented using at least one of: a mainframe type channel subsystem, an interface of a mainframe type intersystem communication device (e.g., a CTCA), a mainframe type channel program, at least one data buffer including either incoming or outgoing data, and queueing and dequeueing methods that enable outgoing data to be introduced to the second system and incoming data to be extracted from the second system.

Also, the intersystem transmission medium may be comprised of at least one of: an optical fiber cable, a wireless radio frequency infrastructure, and an electrical cable, according to some approaches. In addition, at least a portion of the system may be a virtual computer system.

According to another embodiment, an intersystem communication system comprises a first system and a second system. The first system comprises at least one outgoing transmission engine for transmitting data to an intersystem transmission medium and a first plurality of buffers, at least some of which are queued to the at least one outgoing transmission engine. The at least one outgoing transmission engine transmits data in the buffers queued to the at least one outgoing transmission engine to the intersystem transmission medium, and each of the buffers queued to the at least one outgoing transmission engine is dequeued after the data is transmitted therefrom and requeued to a available buffer queue. The second system comprises at least one incoming reception engine for receiving data from the intersystem transmission medium, and a second plurality of buffers, at least some of which are queued to the at least one incoming reception engine. Data which is received from the intersystem transmission medium via the at least one incoming reception engine is stored to the buffers queued to the at least one incoming reception engine, and each of the buffers queued to the at least one incoming reception engine which has data stored therein is dequeued and requeued to at least one work queue. Also, at least one outgoing transmission engine of the first system is operatively coupled via the intersystem transmission medium to at least one incoming reception engine of the second system.

Additionally, the at least one outgoing transmission engine and the at least one incoming reception engine may be implemented using at least one of: a mainframe type channel subsystem, an interface of a mainframe type intersystem communication device (e.g., a CTCA or similar device), a mainframe type channel program, at least one data buffer including either incoming or outgoing data, and queueing and dequeueing methods that enable outgoing data to be introduced to the second system and incoming data to be extracted from the first system, according to some approaches.

Also, in some embodiments, the intersystem transmission medium may be comprised of at least one of an optical fiber cable, a wireless radio frequency infrastructure, and an electrical cable.

Figure 6:
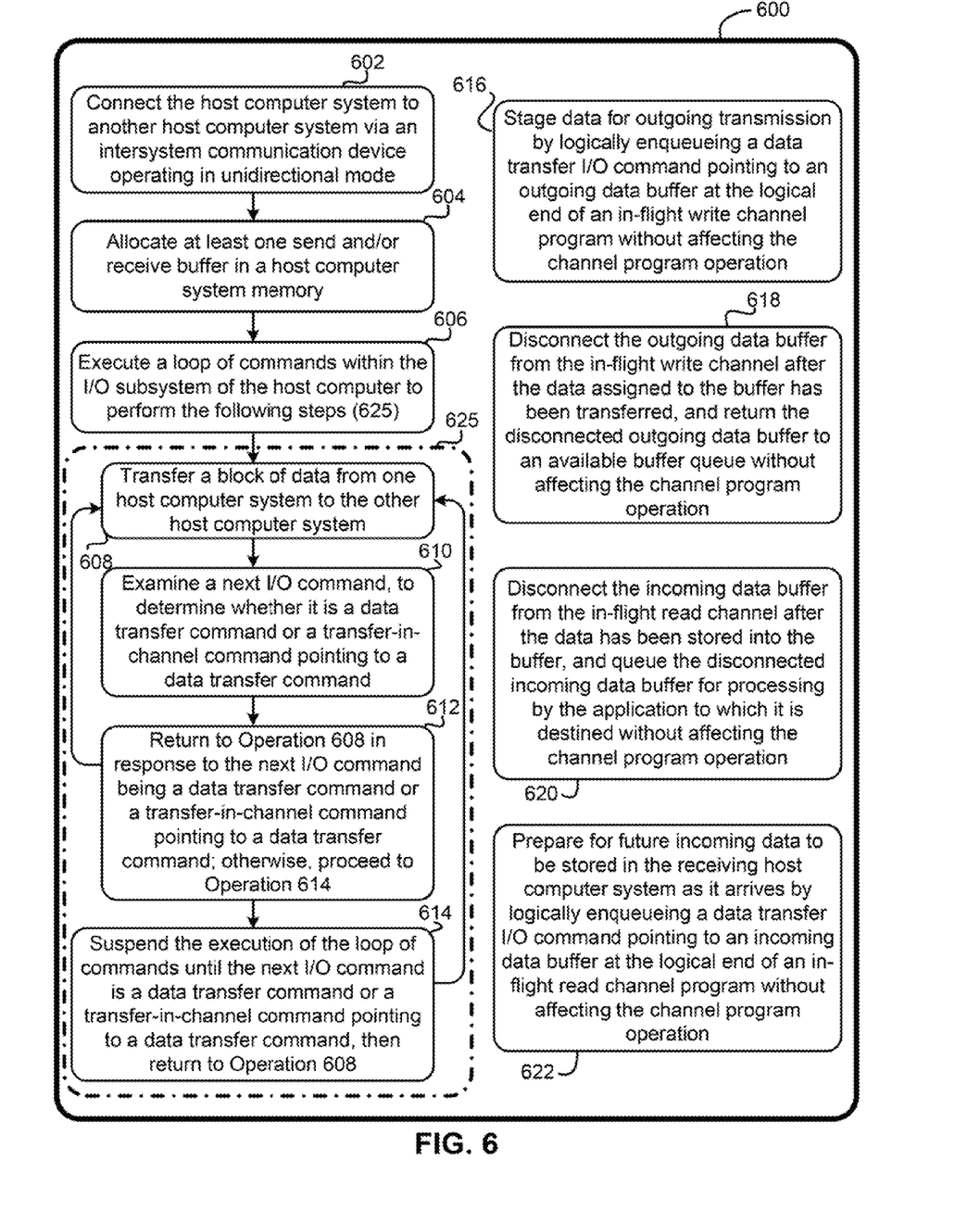
FIG. 6 depicts a flowchart of a method according to one embodiment.

Now referring to FIG. 6, a method 600 for intersystem data transfer may be described according to one embodiment. The method 600 may be carried out in any desired environment, and is not limited to execution in the environments described herein. Some exemplary environments include a computer system, a network, the Internet, etc.

In operation 602, the host computer system is connected to another host computer system via an intersystem communication device operating in unidirectional mode.

In operation 604, at least one send and/or receive buffer is allocated in a host computer system memory.

In operation 606, a loop of commands is executed within the I/O subsystem of the host computer system (for example, by a z/Architecture Channel Subsystem), to perform a series of steps 625.

In operation 608, a block of data from one host computer system is transferred to the other host computer system through the intersystem communication device.

In operation 610, the "next I/O command" (as defined previously) is examined to determine if it is a data transfer command or a transfer-in-channel command pointing to a data transfer command.

In operation 612, if the next I/O command is a data transfer command or a transfer-in-channel command pointing to a data transfer command, the next data transfer I/O command is executed by going back to operation 608.

In operation 614, if the next I/O command is not a data transfer command or a transfer-in-channel command pointing to a data transfer command, execution of the loop of commands is suspended until a new data transfer I/O command is queued for execution by the loop of commands. At that time, the next I/O command is executed by going back to operation 608.

Operation 616 is executed whenever data becomes available for outgoing transmission. In operation 616, data for transfer is staged for outgoing transmission by logically enqueueing a data transfer I/O command pointing to an outgoing data buffer at the logical end of an in-flight write channel program, with the proviso that the write channel program operation is not affected.

Operation 618 is executed whenever all the data in an outgoing buffer has been transferred. In operation 618, the outgoing data buffer is disconnected from the in-flight write channel after the data assigned to the buffer has been transferred, and the disconnected outgoing data buffer is returned to an available buffer queue, with the proviso that the write channel program operation is not affected.

Operation 620 is executed whenever all the data of an inbound message is stored into an incoming data buffer. In operation 620, the incoming data buffer is disconnected from the in-flight read channel program after the data has been stored into the buffer, and the disconnected incoming data buffer is queued for processing by the application to which it is destined, with the proviso that the read channel program operation is not affected.

Operation 622 is executed whenever a fresh incoming buffer can be associated with the in-flight read channel program, to allow the storing of incoming data. That may occur after operation 620 is completed, or at any other time. In operation 622, preparation is made for future incoming data to be stored in the receiving host computer system as it arrives, by logically enqueueing a data transfer I/O command pointing to an incoming data buffer at the logical end of an in-flight read channel program, with the proviso that the read channel program operation is not affected.

According to some embodiments, the method 600 may include additional operations. For example, the method 600 may include receiving data at a host computer via a data transfer I/O command pointing to a first incoming data buffer of an in-flight read channel program, disassociating the first incoming data buffer from the in-flight read channel program after the received data is stored to the first incoming data buffer, making available the first incoming data buffer to which the received data is stored to a user application, with the proviso that the read channel program operation is not affected, associating a second incoming data buffer to the in-flight read channel program, with the proviso that the read channel program operation is not affected, processing the data stored on the first incoming data buffer via the user application, and reassociating the first incoming data buffer to the in-flight read channel program after the data stored therein has been processed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system comprising:
   at least one outgoing, transmission engine implemented in hardware, wherein the at least one outgoing transmission engine is for transmitting data in a plurality of buffers queued to the at least one outgoing transmission engine to an intersystem transmission medium; and
   a memory for storing the plurality of buffers, wherein each of the buffers queued to the at least one outgoing transmission engine is dequeued after the data is transmitted therefrom and requeued to an available buffer queue,
   wherein the intersystem transmission medium is comprised of at least one of an optical fiber cable, a wireless radio frequency infrastructure, and an electrical cable, and wherein each of the buffers queued to the at least one outgoing transmission engine is dequeued in response to the data being transmitted therefrom and requeued to an available buffer queue.

2. The system of claim 1, wherein the at least one outgoing transmission engine is implemented using at least one of:
   a mainframe type channel subsystem,
   an interface of a mainframe type intersystem communication device,
   a mainframe type channel program,
   at least one data buffer including outgoing data, and
   queueing and dequeueing methods that enable outgoing data to be introduced to another system.

3. The system of claim 1, wherein at least a portion of the system is a virtual computer system, and wherein the available buffer queue is configured to hold a plurality of buffers for being put into a queue for processing, at least one queue for processing being accessible by the outgoing transmission engine and at least one queue for processing being accessible by an incoming reception engine.

4. A system comprising:
   at least one incoming reception engine implemented in hardware, wherein the at least one incoming reception engine is for receiving data from an intersystem transmission medium and storing the data to a plurality of buffers queued to the at least one incoming reception engine; and
   a memory for storing the plurality of buffers, wherein each of the buffers queued to the at least one incoming reception engine is dequeued as received data is stored into it and requeued to at least one work queue,
   wherein at least a portion of the system is a virtual computer system, and
   wherein the available buffer queue is configured to hold a plurality of buffers for being put into a queue for processing, at least one queue for processing being accessible by the incoming transmission engine and at least one queue for processing being accessible by an outgoing reception engine.

5. The system of claim 4, wherein the at least one incoming reception engine is operatively coupled to at least one outgoing transmission engine of another system via the intersystem transmission medium, and wherein each of the buffers queued to the at least one incoming reception engine is dequeued in response to the received data being stored into it and requeued to at least one work queue.

6. The system of claim 5, wherein the at least one incoming reception engine is implemented using at least one of:
   a mainframe type channel subsystem,
   an interface of a mainframe type intersystem communication device (CTCA),
   a mainframe type channel program,
   at least one incoming data buffer including incoming data, and
   queueing and dequeueing methods that enable incoming data to be extracted from another system.

7. The system of claim 4, wherein the intersystem transmission medium is comprised of at least one of: an optical fiber cable, a wireless radio frequency infrastructure, and an electrical cable.

8. The system of claim 4, wherein the at least one incoming reception engine is implemented using at least one of:
   a mainframe type channel subsystem,
   an interface of a mainframe type intersystem communication device,
   a mainframe type channel program,
   at least one incoming data buffer including incoming data, and
   queueing and dequeueing methods that enable incoming data to be extracted from another system.

9. The system of claim 4, further comprising:
   at least one outgoing transmission engine implemented in hardware, Wherein the at least one outgoing transmission engine is for transmitting data in a plurality of second buffers queued to the at least one outgoing transmission engine to the intersystem transmission medium;

a memory for storing the plurality of second buffers, wherein each of the second buffers queued to the at least one outgoing transmission engine is dequeued after the data is transmitted therefrom and requeued to an available buffer queue.

10. The system of claim 9, wherein at least one outgoing transmission engine and at least one incoming reception engine are operatively coupled to a second system via the intersystem transmission medium.

11. The system of claim 9, wherein the at least one outgoing transmission engine and the at least one incoming reception engine are implemented using at least one of:
a mainframe type channel subsystem,
an interface of a mainframe type intersystem communication device,
a mainframe type channel program,
at least one data buffer including either incoming or outgoing data, and
queueing and dequeueing methods that enable outgoing data to be introduced to the second system and incoming data to be extracted from the second system.

12. The system of claim 9, wherein the intersystem transmission medium is comprised of at least one of: an optical fiber cable, a wireless radio frequency infrastructure, and an electrical cable.

13. The system of claim 9, wherein at least a portion of the system is a virtual computer system.

14. A computer program product for intersystem communication, the computer program product comprising:
a non-transitory computer readable storage medium having computer readable program code embodied therewith, the computer readable program code comprising:
computer readable program code configured to allocate at least one send and/or receive buffer in a host computer system memory;
computer readable program code configured to connect the host computer system to another host computer system via an intersystem communication device operating in unidirectional mode;
computer readable program code configured to execute a loop of commands on the intersystem communication device which causes the intersystem communication device to execute the following code:
computer readable program code configured to transfer a block of data from one host computer system to the other host computer system;
computer readable program code configured to examine a next I/O command to determine whether the next I/O command is a data transfer command;
computer readable program code configured to execute the next I/O command by transferring a block of data from one host computer system to the other host computer system in response to the next I/O command being a data transfer command;
computer readable program code configured to suspend execution of the loop of commands in response to the next I/O command not being a data transfer command;
computer readable program code configured to stage data for transfer for outgoing transmission by logically enqueueing a data transfer I/O command pointing to an outgoing data buffer at an end of an in-flight write channel program, with the proviso that the write channel program operation is not affected;
computer readable program code configured to disconnect the outgoing data buffer from the in-flight write channel in response to data assigned to the buffer having been transferred; and
computer readable program code configured to return the disconnected outgoing data buffer to an available buffer queue, the available buffer queue being configured to store data buffers which may be used by any process.

15. A method for intersystem data transfer, the method comprising:
allocating at least one send and/or receive buffer in a host computer system memory;
connecting the host computer system to another host computer system via an intersystem communication device operating in unidirectional mode;
executing a loop of commands on the intersystem communication device which causes the intersystem communication device to perform the steps of:
transferring a block of data from one host computer system to the other host computer system;
examining a next I/O command, to determine whether the next I/O command is a data transfer command or a transfer-in-channel command pointing to a data transfer command;
executing the next data transfer I/O command by transferring a block of data from one host computer system to the other host computer system in response to the next I/O command being a data transfer command or a transfer-in-channel command pointing to a data transfer command;
suspending execution of the loop of commands in response to the next I/O command not being a data transfer command or a transfer-in-channel command pointing to a data transfer command;
staging data for transfer for outgoing transmission by logically enqueueing a data transfer I/O command pointing to an outgoing data buffer at an end of an in-flight write channel program, with the proviso that the write channel program operation is not affected;
disconnecting the outgoing, data buffer from the in-flight write channel in response to data assigned to the buffer having been transferred; and
returning the disconnected outgoing data buffer to an available buffer queue, the available butler queue being configured to store data buffers which may be used by any process.

16. The method for intersystem data transfer of claim 15, further comprising:
receiving data at a host computer via a data transfer I/O command pointing to a first incoming data buffer of an in-flight read channel program;
disassociating the first incoming data buffer from the in-flight read channel program in response to the received data being stored to the first incoming data buffer;
making available the first incoming data buffer to which the received data is stored to a user application, with the proviso that the read channel program operation is not affected;
associating a second incoming data buffer to the in-flight read channel program, with the proviso that the read channel program operation is not affected;
processing the data stored on the first incoming data buffer via the user application; and
reassociating the first incoming data buffer to the in-flight read channel program in response to the data stored therein having been processed.

* * * * *